United States Patent
Thatipelli et al.

(10) Patent No.: US 7,020,752 B2
(45) Date of Patent: Mar. 28, 2006

(54) APPARATUS AND METHOD FOR SNOOP ACCESS IN A DUAL ACCESS, BANKED AND PIPELINED DATA CACHE MEMORY UNIT

(75) Inventors: Krishna M. Thatipelli, Fremont, CA (US); Allan Tzeng, San Jose, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 439 days.

(21) Appl. No.: 10/360,686

(22) Filed: Feb. 7, 2003

(65) Prior Publication Data

US 2004/0158683 A1    Aug. 12, 2004

(51) Int. Cl.
*G06F 13/00*    (2006.01)

(52) U.S. Cl. .................. 711/144; 711/145; 711/146; 711/131; 711/154; 713/600

(58) Field of Classification Search ........... 711/144, 711/145, 146, 154, 156, 5, 119, 120, 121, 711/123, 124, 126, 131, 206, 207, 217
See application file for complete search history.

(56) References Cited

U.S. PATENT DOCUMENTS

| | | | | |
|---|---|---|---|---|
| 5,319,768 A * | 6/1994 | Rastegar | ................ | 711/131 |
| 5,471,637 A * | 11/1995 | Pawlowski et al. | ......... | 710/116 |
| 5,553,266 A * | 9/1996 | Metzger et al. | ............. | 711/144 |
| 5,598,550 A * | 1/1997 | Shen et al. | ................ | 711/146 |
| 5,829,032 A * | 10/1998 | Komuro et al. | ............. | 711/141 |
| 6,430,658 B1 * | 8/2002 | Nunez et al. | ................ | 711/146 |
| 6,453,387 B1 * | 9/2002 | Lozano | ........................ | 711/133 |
| 6,460,133 B1 * | 10/2002 | Nunez et al. | ................ | 712/214 |
| 6,675,266 B1 * | 1/2004 | Quach et al. | ................ | 711/144 |
| 2004/0153598 A1 * | 8/2004 | Thatipelli et al. | .............. | 711/5 |

* cited by examiner

*Primary Examiner*—Hong Kim
(74) *Attorney, Agent, or Firm*—Hamilton & Terrile, LLP; Stephen A. Terrile (57) ABSTRACT

In a data cache unit that exchanges data signal groups with at least two execution units, the operation of the data cache unit is implemented as a three-stage pipeline in order to access data at the speed of the system clock. The data cache unit has a plurality of storage cell banks. Each storage cell bank has valid bit array unit and a tag unit for each execution unit incorporated therein. Each valid bit array unit has a valid/invalid storage cell associated with each data group stored in the storage cell bank. The valid bit array units have a read/write address port and snoop address port. During a read operation, the associated valid/invalid signal is retrieved to determine whether the data signal group should be processed by the associated execution unit. In a write operation, a valid bit is set in the valid/invalid bit location(s) associated with the storage of a data signal group (or groups) during memory access. The valid bit array unit responds to a snoop address and a control signal from the tag unit to set an invalid bit in a valid/invalid bit address location associated with the snoop address. The tag unit can be divided into a plurality of tag subunits to expedite processing.

6 Claims, 10 Drawing Sheets

Key To
FIG. 5

APPARATUS AND METHOD FOR SNOOP ACCESS IN A DUAL ACCESS, BANKED AND PIPELINED DATA CACHE MEMORY UNIT

BACKGROUND OF THE INVENTION

1. Field of the Invention

This invention relates generally to data processing systems and, more particularly, to a data cache memory unit forming part of a central processing unit. The data cache unit stores data groups that are required by an associated execution unit of the central processing unit. Because a data signal group stored in the data cache memory unit can be changed in some other part of the data processing system, apparatus must be provided to insure that the execution unit does not process an invalid data signal group.

2. Description of the Related Art

The ability of data processing systems to execute instructions has increased to such an extent that one figure of merit of a data processing unit is the number of instructions executed per second. In this processing environment, the challenge has been to provide data and instruction signal groups to the execution units at a rate commensurate with the rate at which the instructions are being executed. Ideally, a large memory unit including all of the data and instruction signal groups required for the execution of a program would be available for the execution of instructions. However, such a memory unit would not only have to be large enough to handle the enormous amount of data and instruction groups, but would also have to be implemented in a technology that is sufficiently advanced to keep pace with requirements for data and signal groups by the apparatus executing the instructions. In addition, the modem data processing systems process data at such a rapid clock cycle that the physical dimensions over which the information must travel can provide a limitation for the execution of instructions. For these and other practical considerations, the use of a cache memory unit is typically provided in a data processing system.

A cache memory unit is a comparatively small memory unit that is physically positioned close to the execution unit, the unit in the data processing system that executes the instructions needed to process data signal groups according to a sequence of instructions generally referred to as a program. The cache memory unit is designed to store and make accessible the data signal groups and the instruction signal groups for which the execution unit has the most immediate requirement. The cache memory unit is designed to provide the required data and instruction groups in an attempt to minimize the time in which the execution unit is inoperative, i.e., as result of the temporary unavailability of the data or instruction signal groups. In the data processing system with a cache memory, the data and signal groups that are not in the cache memory unit are stored in the main memory unit. Consequently, a continuing exchange of data and instruction groups is maintained between the cache memory unit and the main memory unit in order to provide the required data and instruction groups to the execution unit.

However, as the speed with which instruction groups could be executed has increased, the cache unit associated with the execution unit has expanded to a size wherein the data and instruction groups could not be provided to the execution unit in a timely fashion. As consequence, a memory hierarchy is typically implemented. In this implementation, the data and instruction group stored in a plurality of cache memory units, the cache memory units including the cache memory unit (i.e., an L1 cache memory unit) coupled to the execution unit, through a sequence of intermediate cache memory units, L2 through LN, and terminating in the main memory unit, the main memory unit being the highest memory unit level. The hierarchy of cache memory units is utilized such that the probability that a data signal group will be required by the execution of the data processing unit is highest for the lowest order memory unit, the L1 or instruction/data cache memory unit, and the probability for requirement of a data/instruction group is lowest for the highest order memory unit, the main memory unit. Correspondingly, for the middle memory units of the memory unit hierarchy, the probability for requirement of a data/signal group by the execution unit becomes increasingly higher as the order of the cache memory unit LM in which the data or instruction signal group is stored becomes lower.

Figure 1:
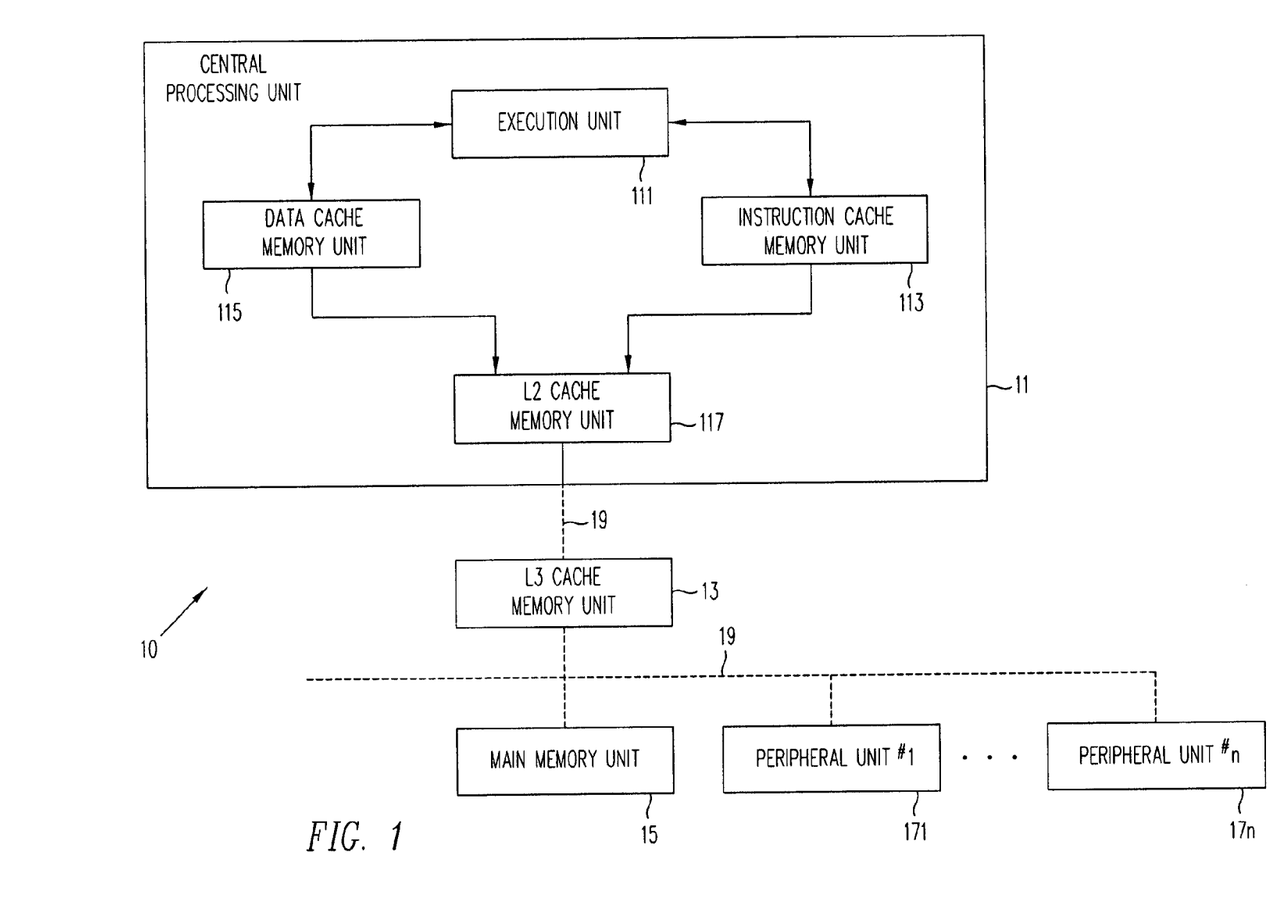
FIG. 1 illustrates the components of a data processing system important to the present invention.

For example, referring to FIG. 1, a data processing system 10 having a hierarchical memory system is shown. The data processing system 10 includes a central processing unit 11, a main memory unit 15 and peripheral units #1 171 through peripheral unit #N 17N. In general, the central processing unit 11 processes data and instruction signal groups that are stored in the main memory 15 and intervening cache memory units. These components are coupled together by at least one bus 19. The peripheral units 171–17N permit the interaction between users and the data processing system 10 and can provide for the storage of programs and data associated with programs not currently being executed. The central processing unit 11 typically includes an execution unit 111, a data cache memory unit 115 and an instruction cache memory unit 113. The execution unit 111 processes data signal groups from the data cache memory unit 115, the processing being performed under the control of instruction signal groups from the instruction cache memory unit 113. The data cache memory unit 115 and the instruction cache memory unit 113 contain the data and instruction signal groups that have the highest probability of being required by the execution unit 111. The data cache memory unit 115 and the instruction cache memory unit 113 together form the L1 cache unit 113, 115. In the central processing unit, an L2 cache memory unit 117 is coupled to the data cache memory unit 115 and the instruction cache memory unit 113. When the required data and/or instruction signal groups are not present in the L1 cache memory unit 113, 115, the execution unit 111 attempts to retrieve the required signal group from the L2 cache memory unit 117. The L2 cache memory unit 117 stores signal groups that have, according to an operating algorithm in the central processing unit 11, less probability of being required by the execution unit than the signal groups in the L1 cache memory unit 113, 115. External to the central processing unit 11, an L3 cache memory unit 13 can be present, and, when the required signal groups are not in the L1 cache memory unit 113, 115 or in the L2 cache memory unit 117, the execution unit will attempt to retrieve the required signal group(s) from the L3 cache memory unit. When the required signal group is not in any of the higher level cache memory units, the execution unit 111 retrieves the required signal group from the main memory unit 15. As will be clear to those skilled in the art, the foregoing description is not complete, but illustrates the relationship of various components of the data processing system 10 to the cache memory unit 115, the unit to which the present invention is most directly addressed.

Figure 2:
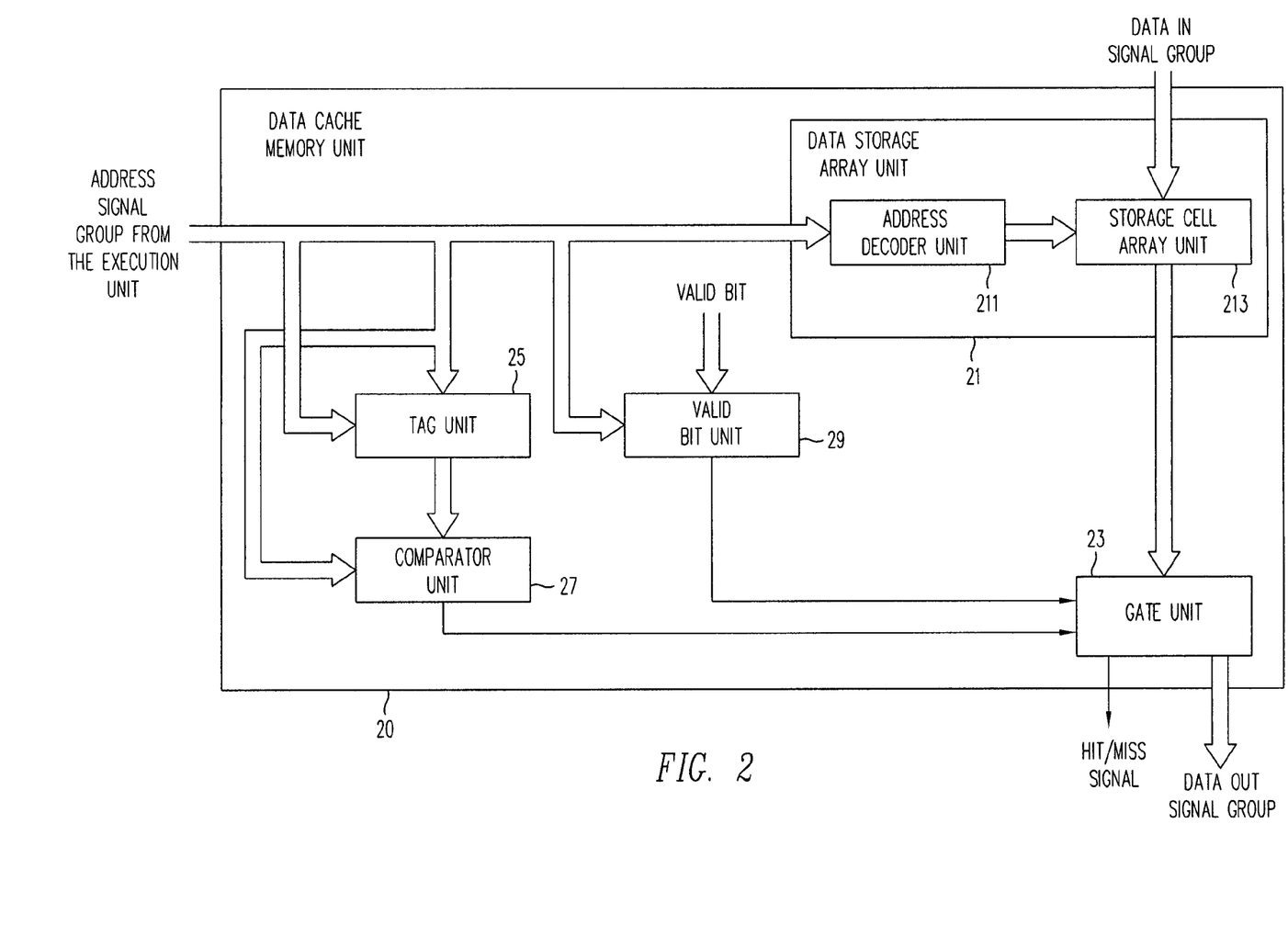
FIG. 2 illustrates the major components of a data cache unit and their respective functions according to the prior art.

Referring next to FIG. 2, the principal components of the data cache unit 20, according to the prior art, is shown. For a WRITE or a READ operation, the data cache unit 20 receives an address signal group from the execution unit requiring the data signal group identified by the address signal group. A data signal group in the data cache memory unit is typically identified by a virtual address signal group, the virtual address signal group being an address signal group used by a central processor to identify a data signal group. The virtual address is a translation of the physical address, the physical address identifying a (physical) address/location of a group of storage cells in the main memory unit. The data cache memory unit 20 stores the data signal groups at a location in a storage cell array. Thus, when the execution unit applies a (virtual) address to the address signal group input port of the data cache unit 20, this address signal group is applied to an address decoder unit 211. The address decoder unit 211 decodes the applied address and accesses a specific group of storage cells in the storage cell array identified by the virtual address. For a WRITE operation, a data-in signal group is applied, through an data-in input port, to the accessed group of storage cells in the storage cell array unit 213 and are stored therein. For a READ operation, the data signal groups in the accessed group of storage cells in the storage cell array 213 are retrieved and applied to data-out output port. The data signal groups applied to the data-out output port are transmitted to the execution unit.

The number of storage cell locations in the storage cell array is not sufficient to provide a cache memory unit location for every possible address. Consequently, the address signal groups are divided in two portions. The first portion, typically referred to as the index portion, is used to identify the location of a group of storage cells in the storage cell array unit 213. The second portion, typically referred to as a tag portion, completes the identification of the particular data signal group. The index portion of the address signal group from the execution unit is applied to the tag unit 25, to a valid bit unit 29 and to the address decoder unit 211. As with the storage cell array unit 213, the index portion accesses specific locations in both the tag unit 25 and the valid bit unit 29. The tag portion of the address signal group from the execution unit is applied to the data-in terminals of the tag unit 25 and to the comparator unit 27. In a READ operation, the application of an address signal group results in a data signal group from the storage cell array unit 213 being applied to the gate unit 23. Simultaneously, the application of the index portion of the address to the tag unit 25 results in a tag portion signal group being applied to the comparator unit 27. Also applied to the comparator unit 27 is the tag portion of the applied address signal group from the execution unit. When the tag portion of the address stored in the tag unit 25 and the tag portion of the applied address signal group are the same, the comparator 27 sends a control signal to gate unit 23. The signal transmitted to the gate unit 23 indicates that the data signal group that is applied to the output terminals of the data storage array unit 21 is, in fact, the data signal group identified by the address signal group from the execution unit. As indicated above, the index address signal group is also applied to the valid bit unit 29. At an addresses location in the valid bit unit 29 is stored at least one valid bit signal. The valid bit identifies whether the data stored in the associated storage cell location is valid. When a data signal group associated with a address signal group is changed or, for some other reason, becomes questionable, an indication must be made that the (now invalid) copies of data signal group in the storage cell array 213 should not be used in further processing. Thus, if a valid bit is no longer associated with an address signal group, the associated data signal group should not be processed by the execution unit. This prohibition against processing is accomplished by applying an appropriate signal, when the valid not is set in valid bit unit 29, to the gate unit 23. Thus, a signal from either the comparator unit 27 or the valid bit unit 29 prevents the data signal group from the data storage array unit 21 applied to gate 23 from being transmitted therethrough. When, for whatever reason, the data signal group is not transmitted by the gate unit 23, a MISS signal is transmitted to the execution unit from the gate unit 23. The presence of this signal permits the execution unit to perform the requisite functions to retrieve the appropriate valid data signal group.

For a WRITE operation, the index portion of the address signal group from the execution unit is applied to the data storage array unit 21, thereby accessing a specific group of locations in the storage cell array unit 213. The data in signal group, associated with the applied address signal group, is stored in the accessed storage cell locations of the storage cell array 213. In addition, the index portion of the applied address signal group is applied to address terminals of the tag unit 25 while the tag portion of the applied address signal group is applied to the data-in terminals of the tag unit 25. The tag portion of the applied signal group is therefore stored in the location in the tag unit 25 associated with the applied address signal group. The location in the valid bit unit 29 associated with the applied address signal group is accessed with the index portion of an address signal group so that a signal in the corresponding valid bit location is updated.

As the need for increased processing power has been felt, one of techniques for meeting this need has been to implement the execution unit using pipeline techniques. In a pipeline implementation, a processing apparatus is designed to implement one operation, for example an addition operation, with a series of sub-operations, each sub-operation requiring an equal time period to perform. The sub-operations are executed in one system clock, each system clock cycle being (typically appreciably) faster than the time to execute the operation in an unpipelined manner. While the total time to implement a pipelined operation can be longer than the time to implement an unpipelined operation, once the apparatus implementing each sub-operation of the pipeline is filled, the processing operations are completed at the rate required to implement each sub-operation, i.e., at the system clock rate. Not-with-standing the need for increased data access speed, provision must be made for data coherency. Data coherency is the requirement that only one "correct" copy of a data group can exist in a data processing system at any one time. When the execution unit processes a data signal group, then the copy of the data signal group in the main memory must be updated. Similarly, when a plurality of data cache units are present in a multiprocessing system, each might contain a copy of a particular data signal group at any one time. When one of the execution unit changes one of the copies of the particular data signal group, then not only must the main memory unit version be updated, but the any other copies of the data signal group in the data processing unit must be invalidated or updated.

A need has therefore been felt for a data cache memory unit having the feature that the integrity of the data signal groups stored in the data cache unit-can be verified without unnecessary impact on the exchange of data signal groups between the data cache memory and the execution unit. It is a further feature of the present invention that data signal groups stored in the data pipelined cache memory unit be provided with an associated valid bit without impact on the rate of storage of data signal groups in the data cache unit.

It is still further feature of the present invention to be able to provide valid bits for the storage of a plurality of data signal groups stored in the data cache memory in a single memory access. It is yet another feature of the present invention to provide apparatus and methods that will permit a snoop operation to be pipelined at the same clock rate as the system clock, and at the same time when the execution unit is accessing the data.

SUMMARY OF THE INVENTION

The aforementioned and other features are accomplished, according to the present invention, by providing in a pipelined data cache memory unit that interacts with two execution units, a plurality of storage cell banks. Each storage cell bank has a valid bit array unit associated with each execution unit. Each valid bit array unit can have valid bits stored therein, which indicates the status of the four data signal groups associated with tag signal group stored in the tag unit. The valid bits can be stored in or retrieved from the valid bit array unit during the normal read and write cycles of the data cache memory unit. In addition, in a WRITE operation in which four data signal groups are stored in the data cache memory, associated valid signals can be stored in the valid array for each of the four stored data signal groups. A separate port is provided in each valid bit array unit so that a snoop address signal can be applied thereto, the snoop address signal being an address signal group identifying a data signal group that is no longer valid. The snoop signal verifies that the tag unit stores the corresponding address and then changes the state of the valid bit for that address. The interaction of the snoop signal with the tag unit and the valid bit array unit occupies two system clock cycles. In order to insure that the two clock cycle period can be met, the tag unit can be divided into four sections and located on either side of the valid bit array unit.

BRIEF DESCRIPTION OF THE DRAWINGS

The present invention may be better understood, and its numerous objects, features, and advantages made apparent to those skilled in the art by referencing the accompanying drawings.

FIG. 4A is flow chart illustrating the activity for a READ operation during each pipeline stage, while

The use of the same reference symbols in different drawings indicates similar or identical items.

DESCRIPTION OF EMBODIMENT(S)

Detailed Description of the Drawings

Figures 3, 3A:
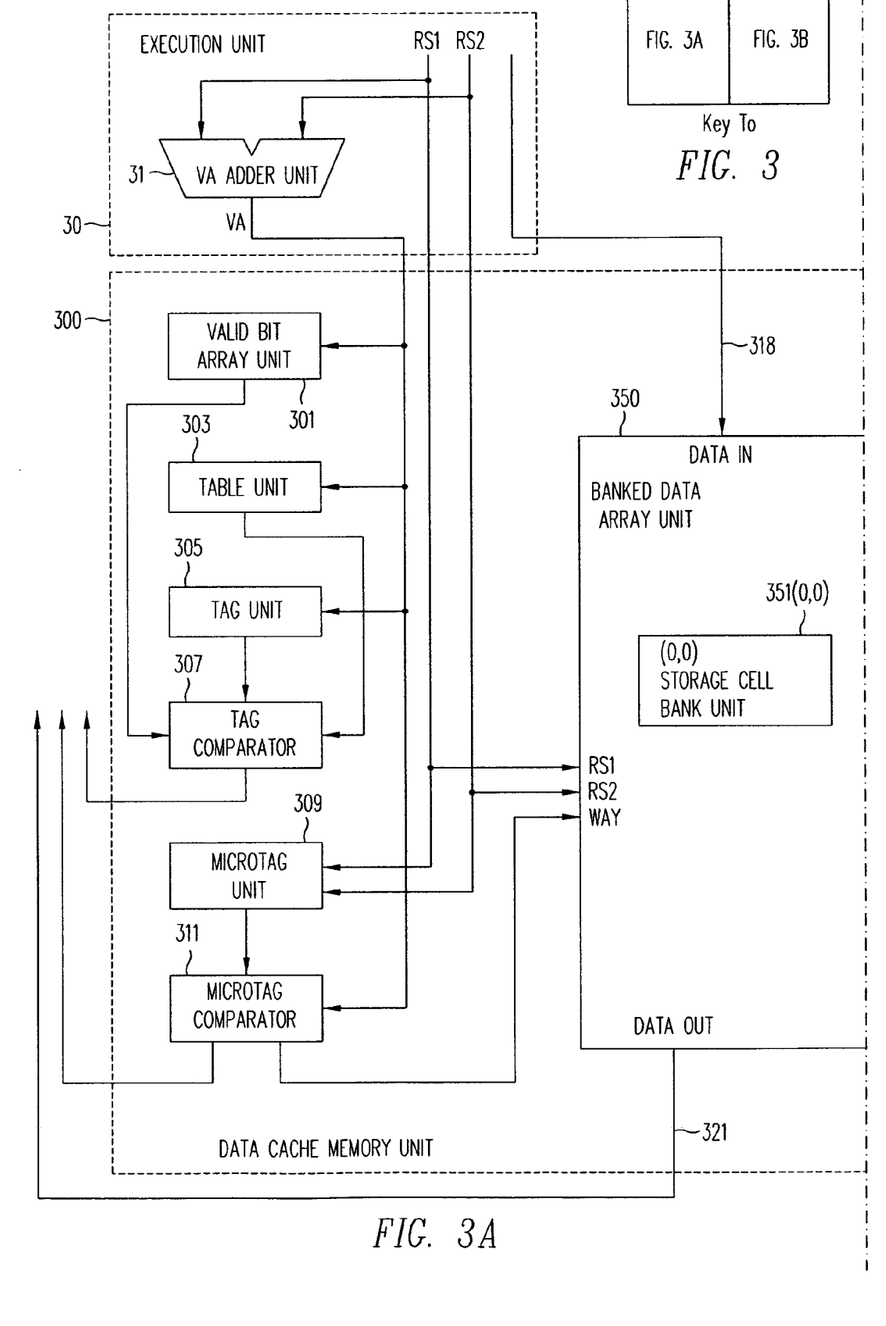
FIGS. 3, 3A and 3B are block diagrams illustrating the organization of the components of a data cache memory unit implementing a data signal group retrieval (READ) operation according to the present invention.
Figure 3B:
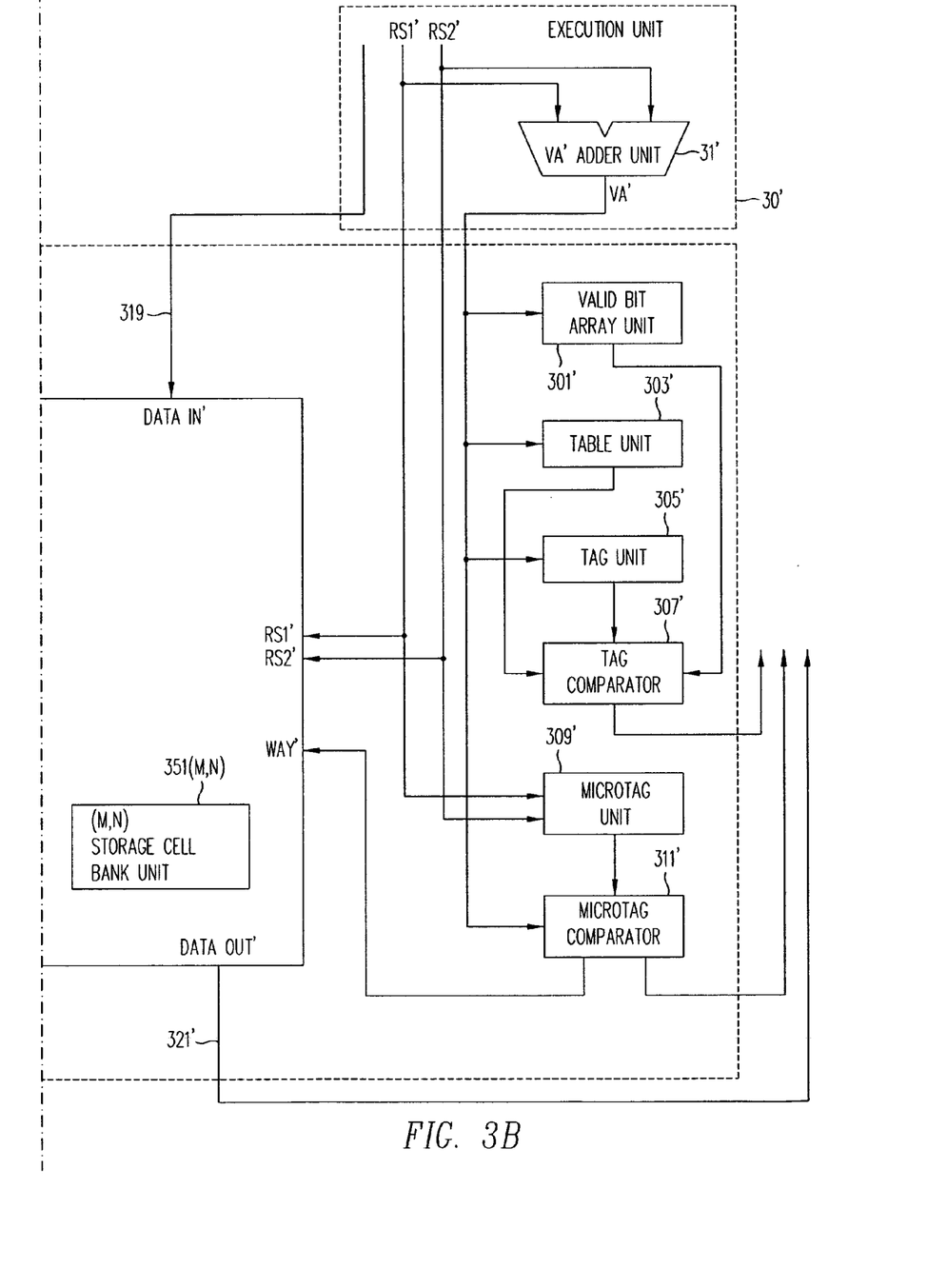

Referring to FIG. 3, the structure of the data cache memory unit 300 and associated apparatus, according to an embodiment of the present invention, is shown. The data cache memory unit 300 illustrates the implementation of a retrieval of information stored in the banked data array unit 350, i.e., the retrieval of information from a memory unit typically referred to as a READ operation. In the READ operation, the banked data array unit 350, the banked data array unit 350 including a plurality of storage cell bank units 351(0,0) through 351(M,N), can retrieve (READ) two data signal groups simultaneously (subject to the restriction that the two data signal groups are not stored in the same storage cell bank unit). The virtual address signal group VA in the execution unit 30 is described by two components RS1 and RS2. The actual virtual address signal group VA is formed by adding the components RS1 and RS2. In the execution unit 30, the components RS1 and RS2 are applied to the input terminals of VA adder unit 31. The virtual address VA is provided at the output terminals of VA adder unit 31. Both the virtual address components RS1 and RS2 and the virtual address signal group VA are applied to the data cache memory unit 300 to retrieve the related data signal group for each execution unit.

Referring again to FIG. 3, a second execution unit 30' is shown. The second execution unit 31' includes a VA' adder unit 31', the VA' adder unit forming a virtual address signal group VA' from the virtual address components RS1' and RS2'. The virtual address signal group VA' and the virtual address components RS1' and RS2' are also applied to the data cache memory unit to retrieve data signal groups stored therein. Each execution unit 30 and 30' has apparatus in the data cache memory unit that responds to the address signal groups applied thereto. The apparatus associated with each execution unit 30 and 30' is generally the same so that, in the following description, only the operation of apparatus associated with execution unit 30 will be described, the operation of the apparatus associated with the execution unit 30' being essentially the same.

The two virtual address components RS1 and RS2 are applied to the banked data array unit 350. As a consequence of application of the virtual address components RS1 and RS2 components to the banked data array unit 350, these components RS1 and RS2 are applied to each of the storage cell bank units 351(0,0)–351(M,N). Each storage cell bank unit 351($m,n$) includes apparatus for determining whether the virtual address components RS1 and RS2 identify the storage cell bank unit 351($m,n$) to which the components are applied. The virtual address components RS1 and RS2 are also applied to the address terminals of the microtag unit 309. The virtual address VA, i.e., the signal group from the output terminals of the VA adder unit 31, is applied to the address terminals of the validity-bit array unit 301, to the address terminals of translation table unit 303, to the address terminals of tag unit 305, and to the microtag comparator 311. The output signals stored in the location addressed by the application of the virtual address VA to the translation table unit 303 are applied to comparator 307. The output signals stored in the locations addressed by application of the virtual address VA in the tag unit 305 are applied to tag comparator unit 307. When the signals from the tag unit 305 do not match the signals applied to comparator 307 from translation table unit 303, then a HIT/MISS signal is transmitted to the associated execution unit 30. When the virtual address VA is applied to the validity bit array, the VALID/INVALID signal stored at the addressed location is applied to the tag comparator 307. When the VALID/INVALID signal indicates invalid data stored at the corresponding location in the banked data array unit 350, then a HIT/MISS signal indicative of a data signal group of questionable integrity is transmitted to the execution unit 30 regardless of the results of the comparison in tag comparator 307. The virtual address components RS1 and RS2 of the virtual address VA are applied to the microtag unit 309. The microtag fields stored at the addressed location in the microtag unit 309 are applied to the microtag comparator 311. When the data field stored in the addressed location of the microtag unit 309 is the same as the corresponding signal group of the virtual address signal group VA, then a way signal group is applied to the banked data array unit 350 and, consequently to each of the storage cell banks 351(m,n). When the signal group stored at the addressed location in the microtag unit 309 is not the same as the corresponding signal group of the virtual address signal group VA, then a microtag HIT/MISS signal is transmitted to the execution unit 30. When a location in a storage cell bank unit is accessed, a plurality of data signal groups, i.e., plurality of double word signal groups in an embodiment, the way signal group identifies which of the plurality of signal groups is identified by the virtual address VA.

In one embodiment, the microtag unit 309 stores virtual address tags of 512 lines with 4 ways of 13 bits (including one parity bit). This data structure is virtually indexed and virtually tagged (VIVT). The microtag unit 309 is implemented with a summing address memory (SAM) component for rapid indexing of the entry address. Bits [13:5] of the virtual address are used to index the stored data, while bits [25:14] are stored as a microtag. The virtual address bits [25:14] are compared with the [25:14] bits in comparator 17. When a match is found then the output signals from the comparator will provide a WAY (address) signal group to the banked data array unit 350 and consequently to all storage cell bank units 351(0,0)–35(m,n). The virtual address components, RS1 and RS2, applied to banked data array unit 350 is consequently applied to all the storage cell bank units 351(0,0)–351(M,N). The application of the virtual address components RS1 and RS2 to the storage cell bank units results in the accessing of a plurality of signal groups in the storage cell bank array 351(m,n) identified by the components. In an embodiment, the plurality of signal groups is implemented as four double words. The application of the way signal group to the identified storage cell bank unit 351(m,n) selects the double word identified by the virtual address VA.

The translation table unit 303 translates the virtual address VA to the physical address PA identifying the data signal group. The translation table unit 303 has a 32 entry CAM (content addressable memory) structure. In an embodiment, the translation table unit 303 also contains apparatus for performing memory protection violation checks.

The tag unit 305 stores physical tags, 2K entries of 33 bits, (32 bits of a physical address tag and a parity bit). The tag unit 305 is a virtually indexed, physically tagged (VIPT) structure. This structure generates a HIT/MISS signal to the execution unit 20 indicating that the required data signal group is not stored in the banked data array unit 350.

The virtual address VA of the data signal group available from the execution unit 30 is transmitted on bus 18. Bus 18 includes two 64 bit sub-busses. Each sub-bus is used to transmit virtual address components RS1 and RS2, respectively. The virtual address components RS1 and RS2 being two components of the virtual address VA and the virtual address VA is formed by the addition of RS1 and RS2 components. The data cache unit 300 can handle any sequence of READ operations and WRITE operations at the rate of one per cycle. The pipeline of data cache unit 300 has a three (system clock) cycle latency. A 64 bit bus 321 transfers the addressed data signal groups from the output terminals of the banked data array unit 350 to the execution unit 30. A data signal group bus 319 transfers data signal groups to be stored in the banked data array unit 350 from the execution unit 30.

Figure 4A:
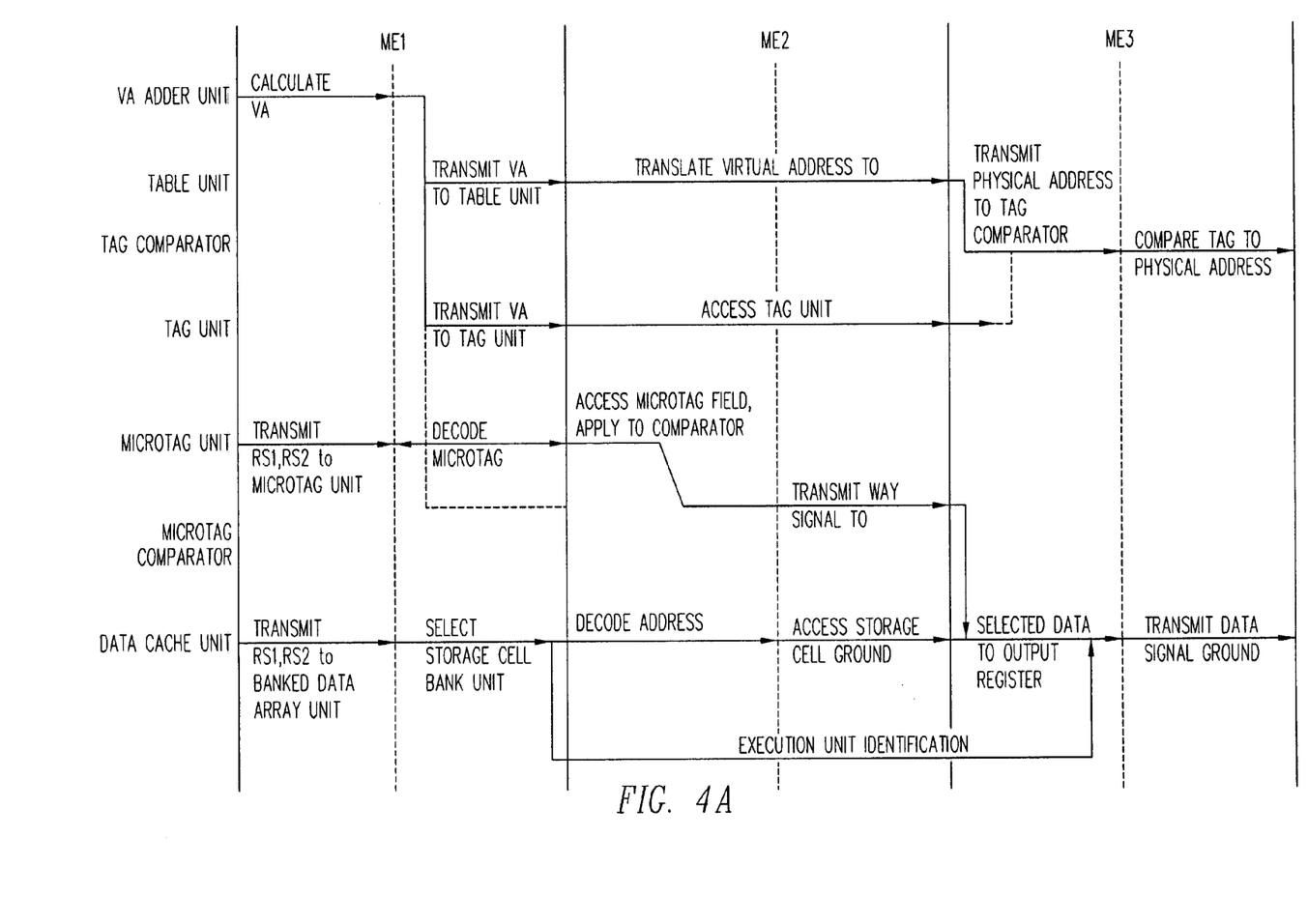
Figure 4B:
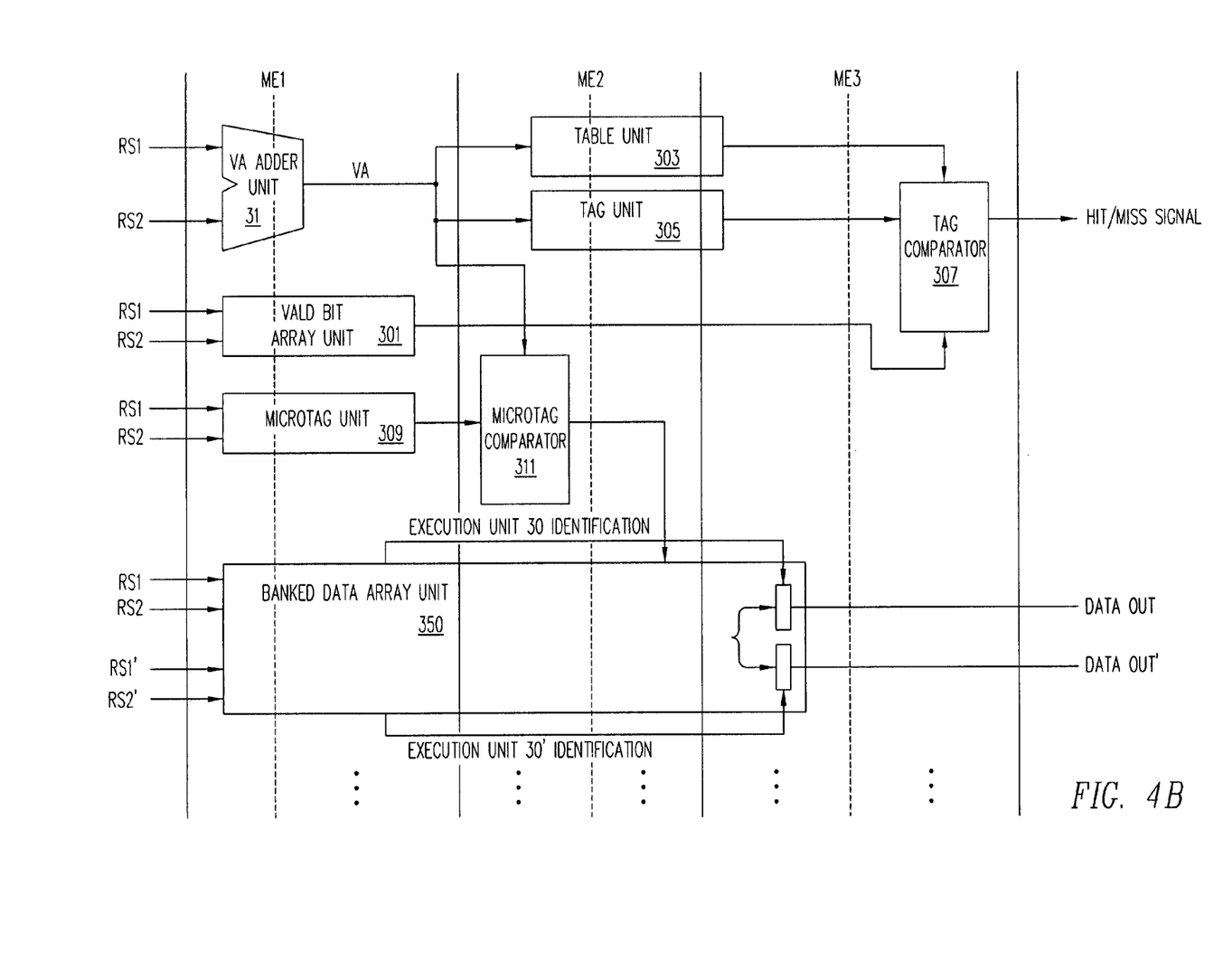
FIG. 4B illustrates the activity during each pipeline stage by indicating the data cache unit component that is active during each pipeline stage.

The implementation of a READ operation takes place in three (pipelined) clock cycles. The activity of the components of the data cache unit 300 during each of the pipeline clock cycles is illustrated in FIG. 4A and FIG. 4B. FIG. 4A provides a written description of the activity during each pipeline clock cycle, the three pipeline clock cycles of the data cache unit being designated as ME1, ME2, and ME3. In FIG. 4A, the leading edge of the clock cycles are shown as solid lines while the dotted lines indicate the intermediate edges of the clock signals. At the beginning of the first pipeline clock cycle, ME1, the execution unit 30 has available the virtual address components RS1 and the RS2 of the virtual address VA. These virtual address components RS1 and RS2 are applied to the microtag unit 305, to the valid-bit array unit 301, and to the banked data array unit 350. The microtag unit 305 decodes the virtual address components during a second portion of the ME1 clock cycle. Apparatus in the storage cell array units 351(0,0)–351(M,N) select the banked data array unit 351(m,n) identified by the virtual address components. The remaining portions of the virtual address components a decoded and access a group of storage cells within the unit 35a. In the execution unit 30 during clock cycle ME1, the virtual address components are applied to VA adder unit 31, VA adder unit 31 generating the virtual address VA. After VA adder unit 31 completes the formation of the virtual address VA in the middle of the ME1 clock cycle, the virtual address is transmitted to the tag unit 305, to the translation table unit 303, and to the microtag comparator 311. The application of the virtual address components RS1 and RS2 to the valid bit array unit 301 accessed a stored bit location. During the first clock cycle, the selection of the storage cell bank unit causes an execution unit identification signal to be applied to a gate unit to which accessed and selected signals are applied.

During the second clock cycle ME2, the translation table unit 303 translates the virtual address VA to a physical address PA. A tag field signal group of the physical address PA is applied to tag comparator 307. The tag unit 305 accesses a tag field group stored therein. The microtag unit 309 accesses the microtag field and applies the field to microtag comparator 311. The microtag comparator 311 compares the accessed microtag signal group with a portion of the virtual address VA, and when that comparison is positive, the microtag signal group is applied to the banked data array unit 350 as the way signal group. Apparatus in the selected storage cell bank unit 351(m,n) decodes the virtual address components, the virtual address components determining a row of storage cells in a bank of storage cells with in the unit 35a. The virtual address components, along with the way signal group (0), determines a 64 bit data signal group. The accessed location in the valid-bit array unit is applied to tag comparator 307.

In the third ME3 stage of the operation of the pipelined cache unit 300, the physical tag from the translation table unit 303 is applied to tag comparator 307. The physical address PA tag is compared in tag comparator 307 to the tag retrieved from the tag unit 307. As a result of this comparison and in view of the signal from the valid-bit array unit 301, a HIT/MISS signal is transmitted to the execution unit 30. The HIT/MISS signal indicates whether the data signal group requested by the execution unit 30 is suitable/unsuitable for use by the associated execution unit. In the banked data array unit 350, the addressed data group is applied to the output terminals of the banked data array unit 350 and transmitted to the execution unit 30. During the third clock cycle, the selected output signals are applied to two gate units, the gate unit being activated by the execution unit identification causing the accessed and selected data signal group to be transmitted to the associated execution unit.

FIG. 4B describes the operation of the pipeline stages in a different manner. In this description, the apparatus or component performing the operation is illustrated, the icon extending for approximately the period of time in which the processing of signal groups is performed. The description follows the description of FIG. 3, but includes the information in FIG. 4A. While the duplicated apparatus of FIG. 3 is not explicitly shown in FIG. 4B, FIG. 4B indicates that both virtual signal components RS1 and RS2 from execution unit 30 and the virtual signal components RS1' and RS2' execution unit 30' are applied to the banked data array unit. When the virtual signal components are identified as addressing a particular storage cell bank unit 351(m,n), then an execution unit identification signal is sent to a gate unit associated with the execution unit. Each storage cell bank unit has two gate units, both gate units receiving the accessed and selected data signal group. However, the execution unit identification activates only the gate unit associated with the execution unit transmitting the virtual address components is activated and this gate applies the signal group to output terminals of the banked data array unit.

As indicated above, the banked data array unit 350 of the present invention can accommodate a READ operation from both execution units 30 and 30' during the same data cache memory operation. The exception to this functionality occurs when both execution units 30 and 30' attempt to access the same storage cell bank unit 351(m,n). Each storage cell bank unit includes apparatus for resolving this conflict. In an embodiment, the state of a flip-flop circuit determines which execution unit will have access to the storage cell bank unit in a conflict situation. Then, the identification of a conflict situation results in a change of state of the flip-flop circuit, thereby assuring that neither execution unit has priority to the storage cell bank units.

Figure 5:
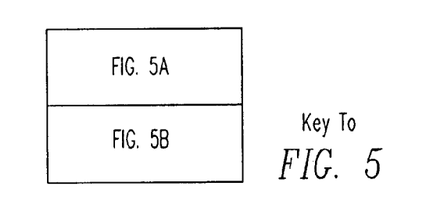
FIGS. 5, 5A and 5B are block diagrams illustrating the operation of the components of a data cache unit implementing a WRITE operation according to the present invention.
Figure 5A:
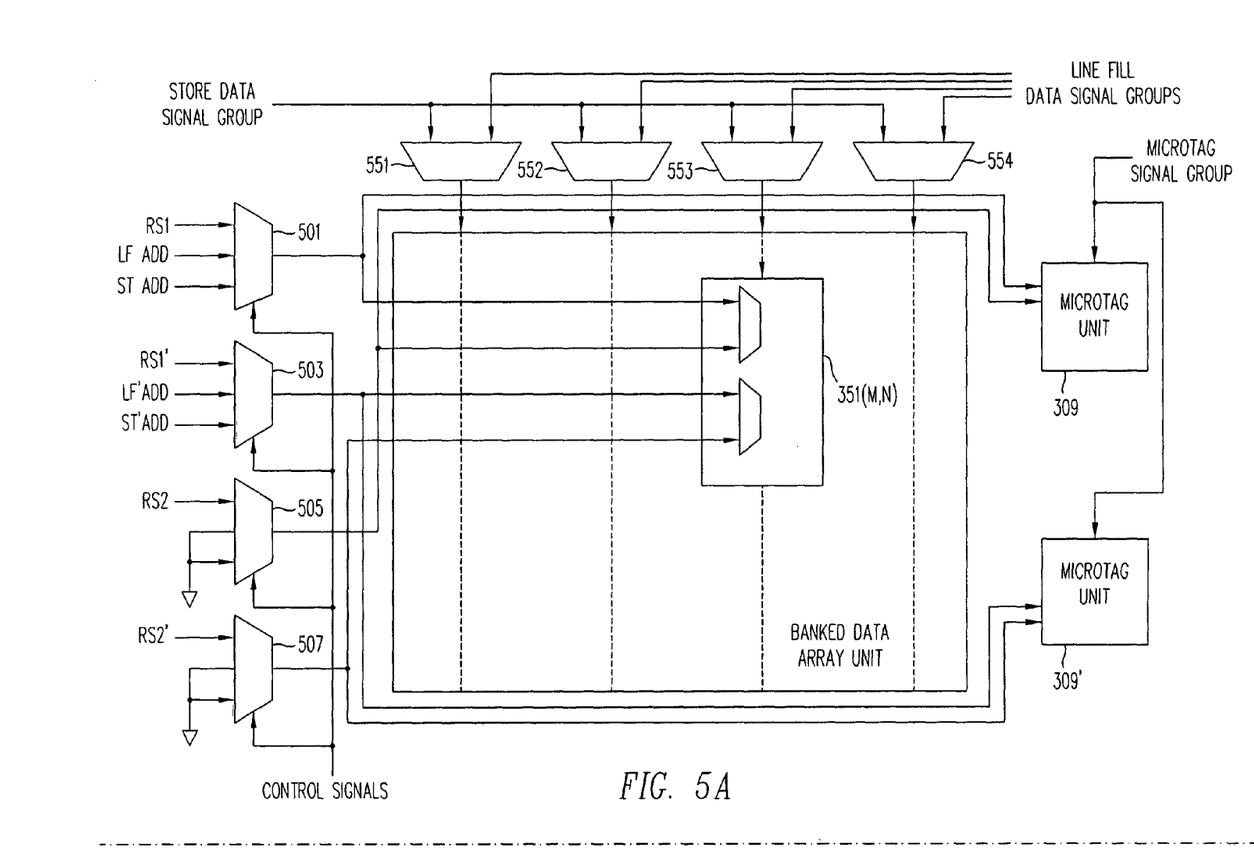
Figure 5B:
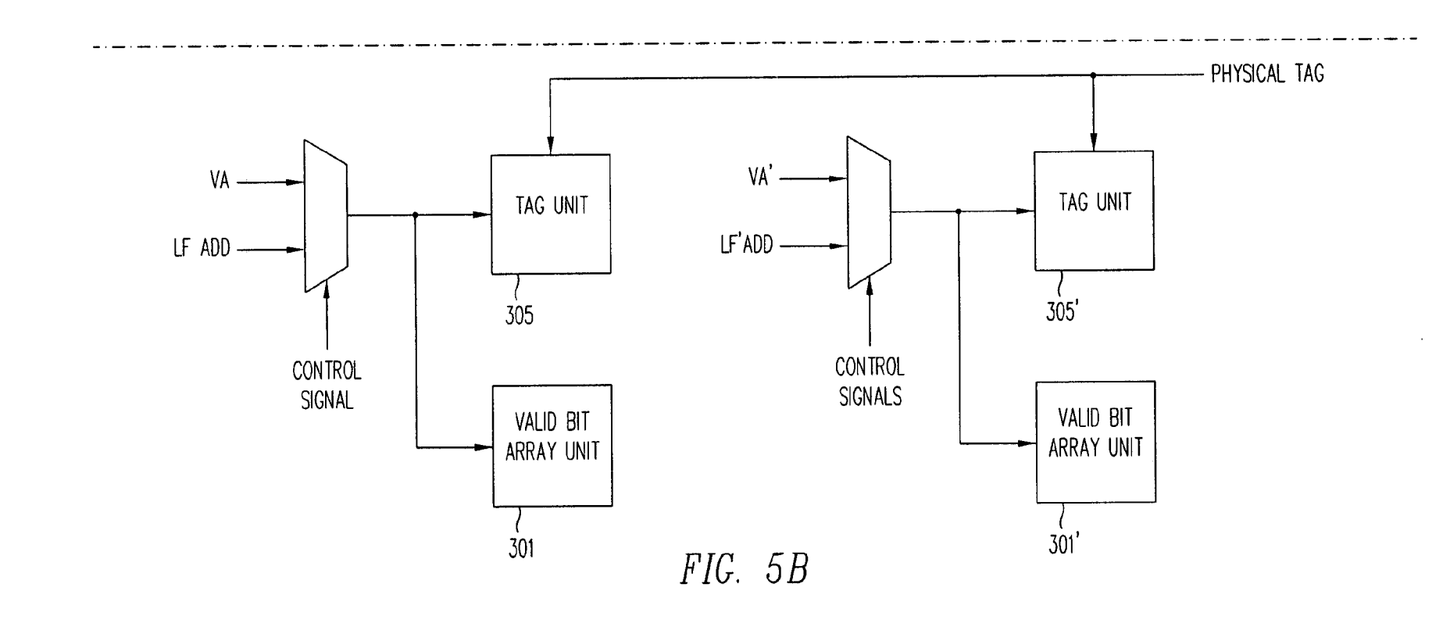

Referring to FIG. 5, the configuration of the data cache unit 300 implementing a WRITE operation is shown. In the WRITE operation, data signal groups are stored in the storage cell bank units at an address identified by the execution unit. The banked data array unit 350 has a multiplicity of bank units 351(0,0)–351(M,N). In an embodiment, in addition to the normal data signal group (double word in the preferred embodiment) WRITE operation, a line fill WRITE operation is possible. In the line fill Write operation, a plurality of signal groups (i.e., double words) is entered in the banked data array unit 350. The ability to perform a WRITE operation in which either a single data signal group or a plurality of data signal groups is performed in the following manner. The storage cell bank units 351(0,0)–351(M,N) are arranged in a matrix and addressed in such a manner that, while the virtual address components for the single signal group WRITE operation (as well as the virtual address components in a READ operation) include a field that identifies a selected storage bank cell unit, in the line fill WRITE operation, that field is formatted whereby all of the storage cell bank unit in a row are accessed. In an embodiment, the storage cell bank unit matrix is four columns wide and four rows in height. The matrix size permits a particularly convenient addressing format with the first two logic signals identifying the row and the second two logic signals identifying the column. Thus, the storage cell bank unit addressing can be arranged such that, in the data group store WRITE operation, the four address positions are specified, thereby specifying one of the sixteen storage cell units. When a line fill WRITE operation is performed, the last two logic signals can be unspecified, thereby causing all of the storage cell bank units in the row identified by the other two logic signals to be accessed.

Referring once again to FIG. 5, in order to implement both the data group WRITE operation and the line fill WRITE operation, the data signal input to the banked data storage array 350 includes four switches 551–554, one switch for each column of storage cell bank units. A data signal group at the output terminals of any of the switches 551–554 will be applied to the data in terminals of all of the storage cell bank units in the associated column. Thus, for a data group store operation, the data signal group from the execution unit is applied to all of the switch units 551–554, selected by control signals, and applied to every storage cell bank unit 351(0,0) through 351(4,4). The store address signal group associated with the WRITE operation selects the storage bank unit and selects the subgroup of a row of storage cells storage cells into which the applied (double word) data signal group is to be stored. In the line fill WRITE operation, a (different) data signal group is applied to each of switches 551–554. These applied data signal groups are consequently applied to each storage cell bank unit in the column storage cell bank units associated with each of the switches 551–554. As indicated above, the address signal group associated with the line fill WRITE operation activates each storage cell unit in a row addressed by the line fill WRITE operation. In addition, each storage cell bank unit in the row addressed by the line fill WRITE operation address addresses the same sub-group of the row of storage cells in the storage cell bank unit. Therefore, four (double word) data signal groups can be stored with a single access of the data cache unit.

In one embodiment, control signals applied to multiplexer 501 and multiplexer 505 determine the address signals from the multiplexer unit 30 to be applied to storage cell bank unit. For the READ operation, the virtual signal components RS1 and RS2 are applied to the storage cell bank units; for the line fill WRITE operation, the line fill address (LF ADD) is applied to the storage cell bank units; and for the store WRITE operation, the store address (ST ADD) is applied to the storage cell bank unit. Similarly, multiplexer 503 and multiplexer 507, in response to control signals determine whether a READ operation address (RS1' and RS2') a line fill WRITE address (LF' ADD), or a store WRITE address is applied to the storage cell bank units by the execution unit 30'. The selected address signal group from the execution unit 30 is applied to the address terminals of microtag unit 309 to retrieve microtag signal groups in a READ operation or to store microtag signal groups in a WRITE operation. Similarly, the selected address signal group from execution unit 30' is applied to the address terminals of the microtag unit 309' to retrieve microtag signal groups for a READ operation and store microtag units for a WRITE operation. For the WRITE operation, the virtual address VA or the line fill address (LF ADD) from the execution unit 30 are applied to the address terminals of the tag unit 305 and the valid bit array unit 301 to store a physical tag and a valid bit in the respective units, while the virtual address VA' or the line fill address (LF ADD) from the execution unit 30' are applied to address terminals of the tag unit 305' and the valid bit array unit 301' to store the physical tag or a valid bit in the respective units.

Figure 6:
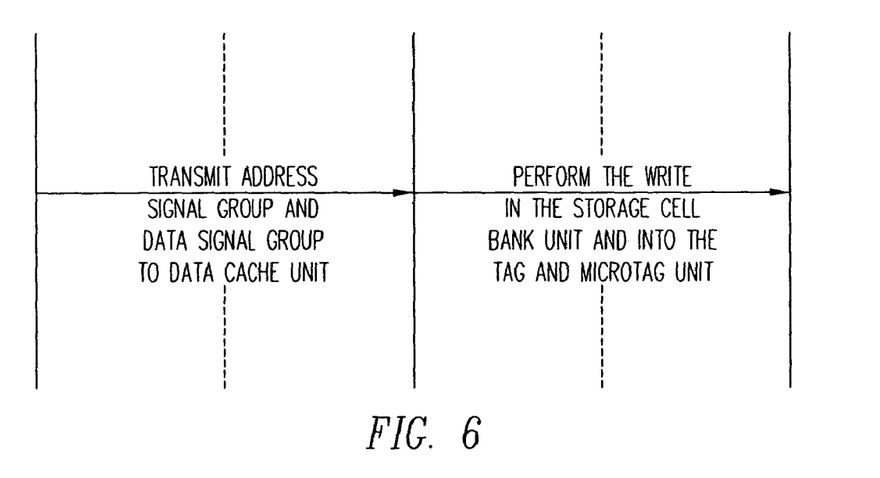
FIG. 6 is illustrates the operation the data cache unit for a WRITE operation during the pipelined operation.

Referring to FIG. 6, the implementation of the WRITE operation in terms of the pipelined organization of data cache unit is shown. In contrast to the READ operation, the data signal groups and the address components are available at the time that the WRITE operation is initiated. Thus, the first clock cycle is available for transmitting the address signal groups and the data signal groups from the execution unit to the appropriate components of the data cache unit. The second clock cycle is available for the actual storage of the data signal groups into the storage cell array unit(s) and into the auxiliary components of the data cache unit 350.

Figure 7:
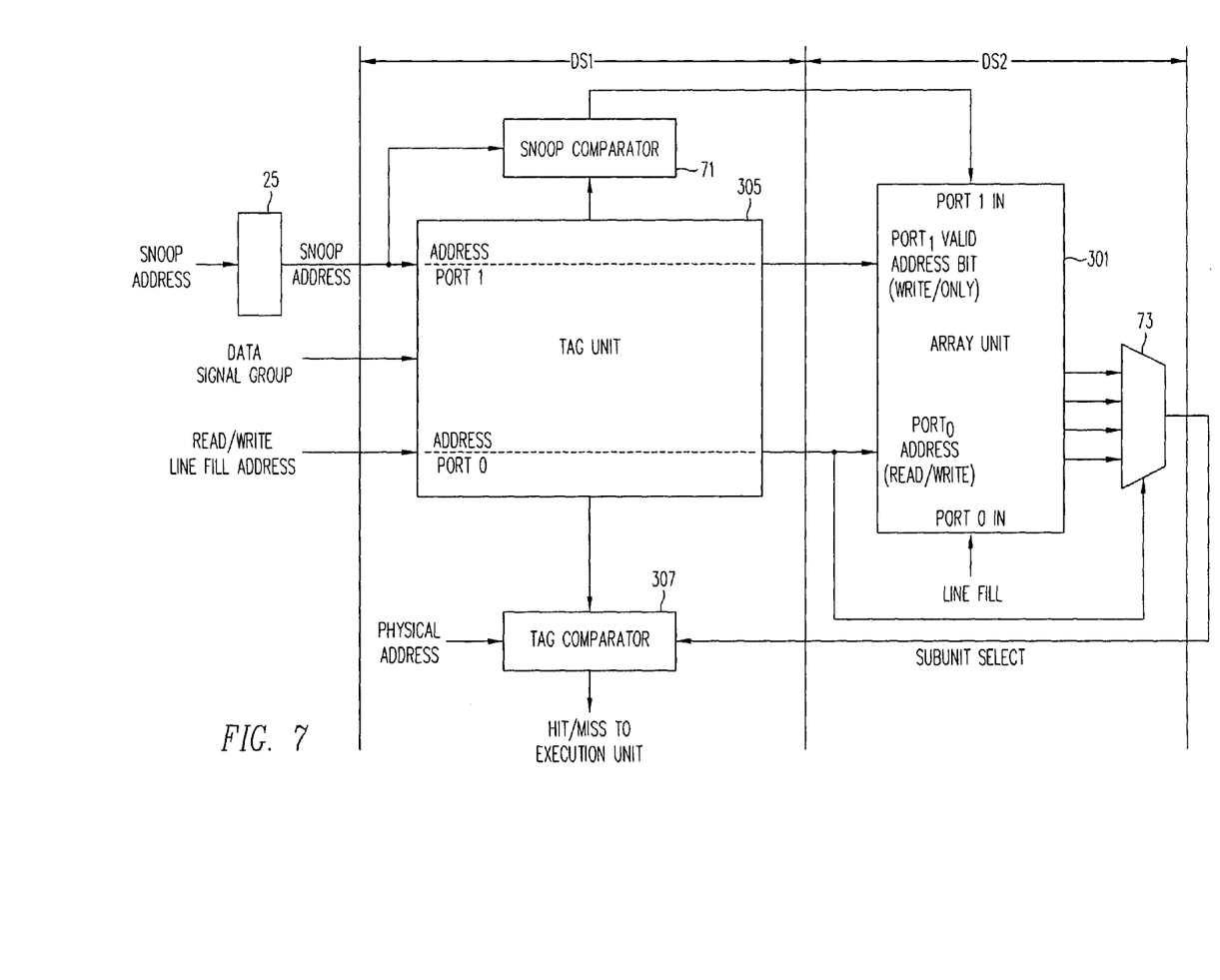
FIG. 7 is a block diagram of the valid bit array unit and the associated apparatus for verification of the validity of the data signal groups and for updating the stored valid bit signals according to the present invention.

Referring to FIG. 7, the apparatus for implementing the validity check and the snoop access procedures is shown. The labeling of the apparatus of FIG. 7 is consistent with the labeling of FIG. 3. During a READ operation, a store WRITE operation and a line fill WRITE operation, the address signal group is applied to the address port 0 of the tag unit 305. This address signal group is also applied to the address port 0 of the valid bit array unit 301. In the READ operation, the tag signal group is retrieved from the tag unit 305 and applied to the tag comparator 307, while in the valid bit array unit, the valid/invalid bits associated with the data signal group are applied to the output multiplexer 73. In response address signal portions of the applied address signal group, the output multiplexer 73 transmits the valid/invalid signals from valid bit array unit 301 to the tag comparator unit 307. The tag comparator unit 307 sends a MISS signal to associated execution unit when the tag field retrieved from the tag unit does not match the equivalent physical address portion applied to the tag comparison unit 307. When the comparison is positive and the valid/invalid signal group from the output multiplexer 73 indicates that the associated data signal group stored in the data cache memory unit is invalid, then the tag comparator 307 transmits a MISS signal to the execution unit, the MISS signal indicating that the associated data signal group should not be used.

In the case of either a store WRITE request or a line fill WRITE request, the address applied to the address port 0 of the tag unit 305 accesses a tag field location in the tag unit 305. The tag field (i.e., the data signal group) is applied to the data in port of the tag unit 305 and is stored in the accessed location. This address signal group is also applied to the port 0 of the valid bit array unit 301. The valid bit is set in the valid bit array unit 301 at the address applied to address port 0. For the line fill WRITE operation, a valid bit must be set for each of the (four double word) data signal groups identified by the way signal groups. In an embodiment, in addition to the address signal group applied to the address port 0, a line fill signal is applied to in port 0. The combination of the line fill WRITE address signals and the line fill signal results in the setting of valid bits for each data signal group identified by the way signal portion of the address signal group.

Data coherency requires that, when a data signal group is altered in some manner, for example by processing in an execution unit, the other copies of the data signal group must be invalidated. One procedure for performing this invalidation is through a snoop procedure. The snoop procedure is, in essence, is the distribution of the address identifying a data signal group that has been altered. In FIG. 7, the valid bit array unit includes a second address port 1. This second address port is a write only address port and changes a valid bit to an invalid bit when the snoop address identifies the data signal group associated with a data signal group stored in the data cache memory. To confirm this identification, the tag unit 305 also includes an address port 1 to which the snoop address is applied. The tag signal group associated with the index portion of the snoop address is retrieved and applied to the snoop comparator 71. The snoop comparator 71 provides a comparison of the tag portion of the snoop address with the tag portion stored in the tag unit. A result of the this comparison provides a signal that is applied to in port 1, the application of the signal to in port 1 enabling the changing of the valid bit to an invalid bit is the addressed location. In fact, the in port 1 receives from snoop comparator 71 four signals, the four signals referring to the four double words identified by the way signals.

Referring once again to FIG. 7, the drawing is divided into two portions labeled DS1 and DS2. These portions represent the clock cycles that are required to implement the snoop operation, i.e., the snoop operation has a two cycle pipeline. During the DS1 clock cycle, an access of the tag unit is performed and a comparison made to determine if the data signal group associated with the snoop address signal group is stored in the data cache memory unit. In clock cycle DS2, when the data signal group is in fact stored in the data cache memory unit, the associated valid bit is altered to an invalid bit.

In an embodiment, because time constraint margins, the tag unit 305 is actually divided into four tag sub units. The two address signal logic signals can therefore be implemented in the snoop comparison unit. In addition, the tag subunits are physically positioned with the valid bit array unit in the middle to reduce the delay in transmission of the results of the snoop comparator 71 to the valid bit array unit 301. The address signal group applied to the address port 0 of the valid bit array unit access the valid bit locations associated with each of the four sections of the tag unit. the multiplexer 73 provides that only the valid bit location associated with the address signal group. Similarly, the snoop comparator 71 selects a one of the four tag subunits that is identified by the snoop address signal group.

Figure 8:
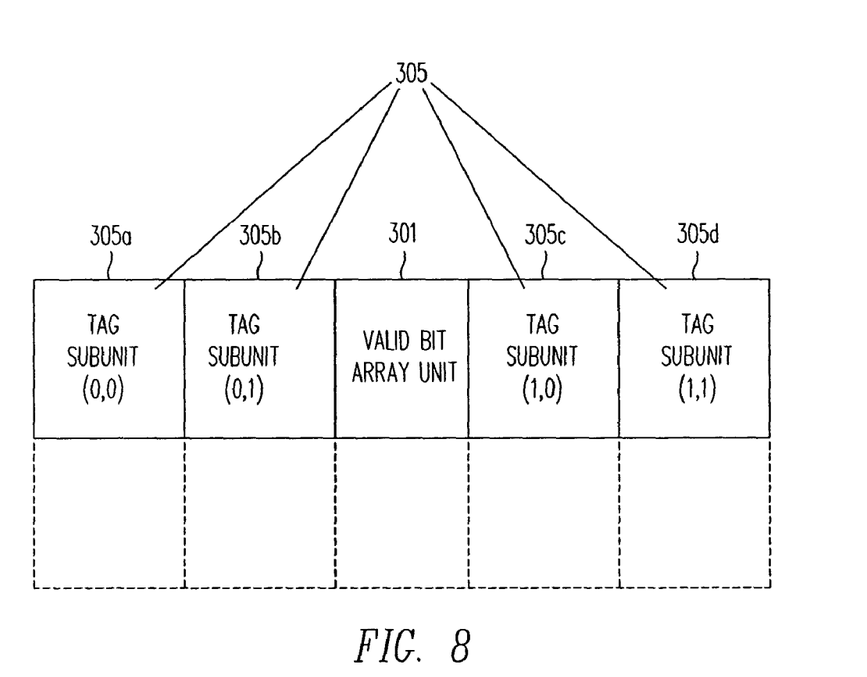
FIG. 8 is a schematic block diagram illustrating a layout of tag unit and the valid bit array unit according to the present invention.

Referring to FIG. 8, the layout of the tag unit 305 and the valid bit array unit 301, according to an embodiment of the present invention is shown. The tag unit 305 is divided into four separately addressable tag subunits 305*a*, 305*b*, 305*c* and 305*d*. The valid bit array unit 301 is placed in the middle of the tag subunits 305*a*, 305*b*, 305*c* and 305*d* to minimize differences in transit time between the signals of the tag subunits 305*a*, 305*b*, 305*c* and 305*d* and the valid bit array unit 301

The pipelined data cache memory unit of the present invention is implemented in such a manner as to provide data signal groups to an execution at the rate that the execution unit is processing instructions. The instruction execution rate of the execution unit is typically achieved by providing pipelined execution unit. Because the execution unit has a pipelined organization, the system clock can be speeded up. While techniques can be used to increase the operation of the data cache unit, the execution rate of the processing unit is faster than can be accommodated by without providing pipelined structure for the data cache memory unit.

To provide data signal groups to the execution unit at the increased system clock rate, the data cache unit of the present invention has been provided with a three stage pipeline for a READ operation. Because of the priority of a READ operation, i.e., to reduce the time that the processing unit is inactive while waiting or a required instruction group, the READ operation is performed without delay and provides a three cycle latency for retrieval on information from the data cache unit. In order to meet the three cycle latency and to perform operations within the system clock cycle, the decoding apparatus for the storage cell bank units array has the two virtual address components transmitted from the execution unit and applied thereto. By implementing the storage cell in SAM (summing address memory) technology, the decoding within the storage cell bank array can begin prior to the completion of the formation of the virtual address, i.e., from the virtual address components. The virtual address is formed from the virtual address components in the execution unit rather than after transmission to the data cache unit. In order to meet the constraints imposed by the system clock and the implementation with a three stage pipeline, the signal group accessed as a result of the READ operation is transmitted to the execution unit whether or not this signal group is the correct signal group. A HIT/MISS signal is transmitted during the same clock cycle to prevent the use by the execution unit of inappropriate data signal groups. A group of data signals stored in an entire row of storage cells is retrieved from an addressed storage cell bank array unit. A switch, responsive to way signals, determines which subgroup of the data signal group is applied to the output terminals of the data cache memory unit.

With respect to a WRITE operation, the present invention provides a store WRITE operation and a line fill WRITE operation. With respect to the store WRITE operation, a data signal group, i.e., a double word in the preferred embodiment, is stored in predetermined memory location. With respect to the line fill WRITE operation, a plurality of data signal groups are stored in the data cache memory during the same memory access operation. The ability to store a plurality of data signal groups in a single memory access cycle is the result of the organization of the storage cell bank units with in the banked data array unit. By providing separate data-in paths to groups (columns of storage cell units in one embodiment) of storage cell bank units, a (different) data signal group can be stored in a group of storage cells in each column. Because the address and the data signal groups are available in the execution unit, the WRITE operation can be performed in two system clock cycles, one clock cycle for the transmission of the signal groups from the execution unit to the data cache unit and one clock cycle for the actual storage of the data signal group in the storage cell array.

The data cache memory unit of the present invention can support the interaction with two execution units simultaneously. Any sequence of READ operations, store WRITE operations, and line fill operations are possible. As indicated previously, two READ operations, one from each execution unit, can be supported simultaneously, provided that data signal group required by the two execution units does not reside in the same storage cell bank unit. Similarly, a store WRITE operation from one execution unit and a READ operation from the second execution can simultaneously performed as long as the same storage cell bank unit is not addressed by the two operation. The efficiency of the interaction between the execution units and the data cache memory unit is enhanced by the ability to store a plurality of data signal groups in the line fill WRITE operation.

Associated with each execution unit in the data cache memory unit is a valid bit array unit. The valid bit array unit stores a valid/invalid bit with each data signal group. During a READ operation, the contents of the valid bit array unit are interrogated to determine whether the associated data signal group can be processed by the associated execution unit. A valid bit signal is set in a location in the valid bit array unit when the execution unit performs a WRITE operation of a data signal group in a corresponding location in the storage cell bank units. When a data signal group is altered or is identified as being unreliable, an snoop address signal group is sent to the data cache memory unit, and also to any other location that night store a copy of the data signal group. With respect to the data cache memory, the snoop address is applied to both of the valid bit array units and to the associated tag unit. The tag unit is accessed to insure that the location accessed in the valid bit array unit relates to the same data signal group that is stored in the cache memory unit. When the two data signal groups are the same, then the location in the valid bit array unit is set with an invalid bit, thereby insuring that any future access of the corresponding data signal will be identified as being inappropriate for processing by the execution unit.

The valid bit array unit has a port for use in the snoop address. This port has the snoop address applied thereto. A separate port is available for receiving the address signal groups during a READ or WRITE operations. In order to change a the logic signal in the valid bit array unit form a valid signal to an invalid signal, a signal is provided from the tag unit. The tag unit also has a separate address port for receiving the snoop address. The location in the tag unit accessed by the snoop address signal group is compared with a tag portion of the snoop address signal group to insure that the location in the valid bit array unit is in fact, associated with corresponding data signal group in the storage cell bank units. The snoop procedure I accomplished in two clock cycles, the clock cycle having the same period as the execution unit clock cycle. In essence, the tag unit is accessed to determine if the data signal group associated with the snoop address signal group is stored in the data cache memory unit. A tag unit and valid bit array unit are associated with each execution unit.

When the valid bit array unit is accessed in a READ operation, four valid/invalid signals a retrieved corresponding to the four way signals. In the READ operation, the valid/invalid signal is selected based on the tag signal group determined by the physical address (i.e., in tag comparator 307). The division of the tag unit into a plurality of subunits can be accommodated in the tag comparator 307, the snoop comparator 71 and multiplexer 73.

The valid bit array unit has an additional feature of importance when a line fill WRITE operation in being performed. In the line fill WRITE operation, a plurality of data signal groups are stored in the data cache unit during a single memory access operation. The plurality of data signal groups are stored in identical locations in a row of storage cell bank units. Using this symmetry and a control signal indicating that the operation is a line fill operation, the valid bit array unit can enter all of the valid bits at once.

Those skilled in the art will readily implement the steps necessary to provide the structures and the methods disclosed herein, and will understand that the process parameters, materials, dimensions, and sequence of steps are given by way of example only and can be varied to achieve the desired structure as well as modifications that are within the scope of the invention. Variations and modifications of the embodiments disclosed herein may be made based on the description set forth herein, without departing from the spirit and scope of the invention as set forth in the following claims.

What is claimed is:

1. In a data cache memory interacting with a first execution unit and a second execution unit; a valid bit array unit, the unit comprising:

a group of addressable storage cells, the data cache memory including a tag unit, each storage cell storing a valid/invalid bit signal;

a first address port for accessing a plurality of storage cells during a read and a write operation in response to an address signal group, the valid bit array unit retrieving a plurality of valid bit signals from the accessed location in response to read operation address signal group, the valid bit array unit storing a valid bit;

a second address port for accessing a plurality of storage cell location in response to a snoop address signal group;

a control signal port having a control signal generated from the from the tag unit applied thereto, wherein the application of the control signal specifies the storage cell of the valid bit to be changed to an invalid bit; and wherein the tag unit is divided into a first plurality of independently addressable subunits, wherein application of an address signal group to the address port in a read operation causes the retrieval of the plurality of signals in valid/invalid bit locations associated with each tag subunit; and, the valid bit array unit is located between the tag subunits to minimize difference in transit time between signals of the tag subunits.

2. The valid bit array unit as recited in claim 1 further comprising:

a second control signal port, wherein application of a second control signal indicative of the storage of a plurality of data signal groups in the data cache memory unit and an address signal group applied to the address port causes the storage of a plurality of valid signals at locations in the valid bit array unit corresponding to the location of the data signal groups.

3. The valid bit array unit as recited in claim 1 wherein the valid bit array unit further comprises:

a multiplexer coupled to output terminals of valid bit array unit, the multiplexer selecting the plurality of valid/invalid bit locations corresponding to one tag subunit for transmission.

4. The valid bit array unit of claim 1 wherein an access to the data cache unit takes at most three system clock cycles, the snoop operation taking two system clock cycles.

5. The valid bit array unit of claim 4 wherein the generation of a control signal by the tag unit is implemented in one clock cycle and the setting of an invalid bit at a location in valid bit array unit is implemented in a second system clock cycle.

6. The valid bit array unit of claim 1, wherein the data cache unit is divided into a plurality of storage cell banks, each storage cell bank having a least one valid bit array unit incorporated therein.

* * * * *